(12) United States Patent  
Schweiger et al.

(10) Patent No.: US 12,181,856 B2  
(45) Date of Patent: Dec. 31, 2024

(54) METHOD AND SYSTEM FOR COLLECTING MACHINE DATA

(71) Applicant: Technische Hochschule Deggendorf, Deggendorf (DE)

(72) Inventors: Florian Schweiger, Roding (DE); Ilja Fuchs, Hunderdorf (DE); Andreas Grzemba, Deggendorf (DE)

(73) Assignee: Technische Hochschule Deggendorf, Deggendorf (DE)

( * ) Notice: Subject to any disclaimer, the term of this patent is extended or adjusted under 35 U.S.C. 154(b) by 500 days.

(21) Appl. No.: 17/423,460

(22) PCT Filed: Jan. 9, 2020

(86) PCT No.: PCT/EP2020/050372  
§ 371 (c)(1),  
(2) Date: Jul. 15, 2021

(87) PCT Pub. No.: WO2020/148142  
PCT Pub. Date: Jul. 23, 2020

(65) Prior Publication Data  
US 2022/0083021 A1 Mar. 17, 2022

(30) Foreign Application Priority Data  
Jan. 17, 2019 (DE) .................. 10 2019 101 132.9

(51) Int. Cl.  
*G06V 30/00* (2022.01)  
*G05B 19/406* (2006.01)  
*G06V 30/10* (2022.01)

(52) U.S. Cl.  
CPC .......... *G05B 19/406* (2013.01); *G06V 30/10* (2022.01); *G05B 2219/50185* (2013.01)

(58) Field of Classification Search  
CPC ........ G05B 19/406; G05B 2219/50185; G05B 19/0428; G06V 30/10  
See application file for complete search history.

(56) References Cited

U.S. PATENT DOCUMENTS

2017/0169593 A1* 6/2017 Leigh ................. G06V 30/142  
2017/0249731 A1 8/2017 Van Gorp et al.  
(Continued)

FOREIGN PATENT DOCUMENTS

DE 69529015 T2 10/2003  
DE 102013013365 A1 2/2015  
(Continued)

OTHER PUBLICATIONS

Office Action mailed Oct. 4, 2022, issued in corresponding European Application No. EP 20 700 772.5-1205, filed Jan. 9, 2020, 22 pages.  
(Continued)

*Primary Examiner* — Ping Y Hsieh  
(74) *Attorney, Agent, or Firm* — CHRISTENSEN O'CONNOR JOHNSON KINDNESS PLLC

(57) ABSTRACT

A method for collecting machine data from a machine comprising the following steps: collecting image information displayed on a graphical user interface of a machine and transmitting the collected information to a computer unit; masking the collected information or information derived therefrom to define data regions; extracting alphanumeric characters from at least one data region by means of a text recognition program; writing the alphanumeric characters into a data structure; and storing or outputting the data structure.

17 Claims, 3 Drawing Sheets

(56) References Cited

U.S. PATENT DOCUMENTS

| | | | |
|---|---|---|---|
| 2018/0023837 A1 | 1/2018 | Kraft et al. | |
| 2018/0040123 A1* | 2/2018 | Neff | G06V 20/63 |
| 2018/0096205 A1 | 4/2018 | Russell et al. | |
| 2019/0026577 A1* | 1/2019 | Hall | G06V 30/413 |
| 2021/0012305 A1* | 1/2021 | Takata | G07G 1/0036 |

FOREIGN PATENT DOCUMENTS

| | | |
|---|---|---|
| DE | 102016124146 A1 | 6/2018 |
| DE | 102017103394 A1 | 8/2018 |
| EP | 1917588 A2 | 5/2008 |
| EP | 2003815 B1 | 12/2008 |
| JP | 2008305259 A | 12/2008 |

OTHER PUBLICATIONS

Written Opinion and International Search Report mailed Mar. 31, 2020, in corresponding International Application No. PCT/EP2020/050372, 22 pages.

Office Action in corresponding German Application No. 102019101132.9, 10 pages.

Office Action mailed Jun. 14, 2024, issued in corresponding European Application No. EP 20 700 772.5-1205, filed Jan. 9, 2020, 22 pages.

* cited by examiner

METHOD AND SYSTEM FOR COLLECTING MACHINE DATA

FIELD

The invention relates to a method and a system for collecting machine data.

BACKGROUND

The machinery of companies is often inhomogeneous, i.e. comprises machines of different manufacturers and/or types. In addition, the machines often have different ages, so that wide technological differences exist among the machine technology, in particular the control technology, of the individual machines.

Due to this inhomogeneity of the machinery, it is often not possible to integrate machines into a fully automated process monitoring system since this would require current machine data or process data to be read out from the machines, but these machines do not have the necessary interfaces for outputting the machine data and/or process data.

SUMMARY

Based on this, an object of the present disclosure is to provide a method for collecting machine data, which allows a technically simple and reliable collection of machine and/or process data for different types of machines and/or different machine control systems.

This object is achieved by an embodiment disclosed herein. A system for collecting machine data is the subject matter of an embodiment disclosed herein.

According to a first aspect, the present disclosure relates to a method for collecting machine data from a machine. This method comprises the following steps:

The image information displayed on a graphical user interface of a machine is initially collected. In this context, "collection of image information" is understood to mean that this information is optically detected or collected on the graphical user interface by a suitable image-acquiring unit or that electrical signals are collected which contain image information and are transmitted, for example, between the machine and its graphical user interface. This collected information is transmitted to a computer unit in order to further process this information in a suitable manner.

Subsequently, the collected information or information derived therefrom is masked to define data regions. "Information derived therefrom" here means information that was obtained from the collected information by further information technology processing. Masking can be carried out, for example, on the basis of a data mask indicating at which local position on the graphical user interface or at which position in the collected information or information derived therefrom which data can be collected.

Thereafter, alphanumeric characters are extracted from at least one data region by a text recognition program. In this context, "extracted" means that the collected image information in at least one data region is analyzed by means of a text recognition program and the information recognized in this data region is converted into one or more letters and/or numbers. This can be done, for example, by means of OCR recognition (OCR: optical character recognition).

Finally, the extracted alphanumeric characters are written into a data structure. The data structure can be any structure or any data set into which the extracted alphanumeric characters can be inserted. Finally, the data structure is stored or output.

In addition, it should be noted that the present disclosure is not limited to an exclusive extraction of alphanumeric characters. It is rather also possible to extract graphic sections and/or image components from the image information and store them in the data structure. This offers the possibility, for example, of checking the correctness of the current production program at a monitoring point by visualizing the 3D model present at the system.

The major advantage of the method according to the present disclosure is that information which is displayed on the graphical user interface is used to collect machine data and store it in a data structure for further processing it at a later stage, e.g. in the form of automatic process monitoring and/or process analysis. It is thus possible to collect and further process the process data from machines of the most different types in an automatic way and in a technically simple and reliable manner.

According to an exemplary embodiment, the image information is collected periodically at different points in time, so that the collected information contains information about the temporal change of the image information. Periodic extraction of alphanumeric characters and writing of the extracted characters into the data structure are carried out in the same way. It is thus possible to infer the temporal change of the machine data from the time-dependent course of the collected information.

According to one exemplary embodiment, the image information is collected by sampling with a predetermined sampling frequency. This allows machine data to be periodically collected and written into the data structure.

According to one exemplary embodiment, the collection of the image information includes capturing the image information displayed on the graphical user interface by means of a camera. The camera can be used to convert the image information displayed on the graphical user interface into electrical signals and transmit them to the computer unit for further processing by the computer unit.

According to one exemplary embodiment, the collection of the image information comprises collecting the electrical image information signals transmitted between a graphical output interface of the machine and the graphical user interface. For example, a signal splitter having an input interface and a plurality of output interfaces can be introduced into the cable connection between the graphical output interface and the graphical user interface, one output interface being connected to the graphical user interface and another output interface being connected to the computer unit. The image information signals can be e.g. VGA signals, DVI signals, DisplayPort signals, or HDMI signals. This allows the image information signals transmitted directly to the graphical user interface to be further processed by the computer unit, which offers advantages in terms of collection quality and collection reliability.

According to one exemplary embodiment, the collected information or information derived therefrom is processed by means of at least one image processing program before alphanumeric characters are extracted. The processing can be, for example, a filtering, a contrast change, a color change and/or a color contrast change, wherein the contrast change or the color contrast change can be a contrast increase or the color contrast increase or a contrast reduction or the color contrast reduction. It is thus possible to reduce the error rate in the extraction of the alphanumeric characters.

According to one exemplary embodiment, the collected information is verified in a verification step after the text recognition. As a result of the verification step it is possible to decisively reduce the risk that errors occur during text recognition and that therefore incorrect information is written into the data structure.

According to one exemplary embodiment, it is determined in the verification of the collected information whether the values of information collected consecutively in time change more than a predetermined change threshold value. In case that the change threshold value is exceeded, this can be due to the fact that incorrect information collection or text recognition has occurred since the changes are usually below this change threshold value.

According to one exemplary embodiment, it is determined by means of the verification step whether a change in image processing parameters, in particular a change in parameters of a filtering, contrast increase, etc., results in a change in the extracted alphanumeric characters. If such a change in image processing parameters, in particular a change of small amount, leads to a significantly different extraction result, it can be assumed that even small changes in the collection quality lead to erroneous extraction results.

According to one exemplary embodiment, a plurality of data sets is stored in the computer unit in order to collect machine data from different machine types. Each data set is associated with one or more machine types and can comprise information for masking the collected information, for filtering the collected information, for font and/or font size. It is thus possible to select, depending on the machine type, the machine data of which shall be collected, a data set associated with that machine type in order to mask and further process the collected information.

According to one exemplary embodiment, a plurality of different pages, each with different image information, can be displayed on the graphical user interface, and switching between the pages is carried out in order to collect the image information of the different pages. The switching can, in particular, cause the pages to be scrolled through sequentially in order to make it possible to collect the information displayed on these pages in each case as machine data and to process it further when it has been written into the data structure.

According to a further aspect, the present disclosure relates to a system for collecting machine data. The system comprises a collection unit by means of which image information displayed on a graphical user interface of a machine can be collected. A collection unit can be provided, for example, by a camera or a signal splitter, as described above. In addition, the system comprises a computer unit which is coupled to the collection unit and which is designed to receive the information collected by the collection unit. In this connection, the computer unit is designed to mask the collected information or information derived therefrom in order to define data regions, to extract alphanumeric characters from at least one data region by a text recognition program, and to write the extracted alphanumeric characters into a data structure or to output the extracted alphanumeric characters into a data stream.

According to one exemplary embodiment of the system, the computer unit has one or more data input interfaces by means of which the computer unit can be coupled to one or more collection units. In the case of multiple data input interfaces, the computer unit can receive and further process information from graphical user interfaces of a plurality of machines in parallel.

According to one exemplary embodiment, the computer unit has one or more data output interfaces by means of which a data structure containing alphanumeric characters or a data stream of alphanumeric characters is output. In this connection, the computer unit can receive and further process, separated according to machines in each case, the machine data from such machines at the data output interfaces or data structures can be output. Alternatively, it is possible that only one data output interface is provided and that—if information from graphical user interfaces of a plurality of machines is received and processed in parallel by the computer unit—at this data output interface data structures are output which have a unique identifier, the identifier indicating to which machine the respective data structure is assigned. Furthermore, it is also possible that a data structure, for example a table, contains machine data from different machines, the machine data on the different machines being distinguishable from one another, for example, by an arrangement in rows and columns.

According to one exemplary embodiment, each data input interface and each data output interface is associated with one machine in each case.

As a result, the information of the individual machines can be received in parallel at the respective data input interfaces and the respective data structures assigned to the machines can be output separately from one another in parallel at the data output interfaces.

According to one exemplary embodiment, the computer unit has a switching interface for providing a switching signal by means of which switching between pages of the graphical user interface of a machine is carried out. In this way, the computer unit can cause switching of the pages and processing of the information displayed on these pages.

The expressions "approximately", "substantially" or "about" mean in the sense of the present disclosure deviations from the respective exact value by +/−10%, preferably by +/−5% and/or deviations in the form of changes which are insignificant for the function.

Further developments, advantages and possible uses of embodiments of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. The content of the claims is also made a part of the description.

BRIEF DESCRIPTION OF THE DRAWINGS

The present disclosure will be explained in more detail below with reference to the drawings by means of exemplary embodiments, wherein.

DETAILED DESCRIPTION

Figure 1:
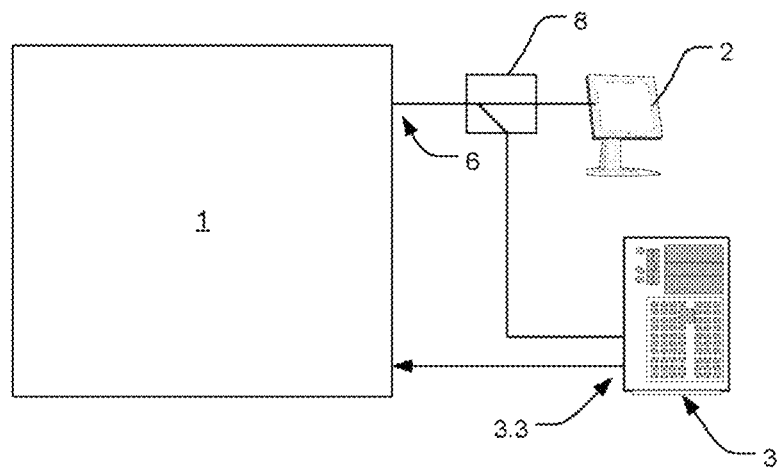
FIG. 1 shows exemplarily and schematically a first exemplary embodiment of a system for collecting machine data.

FIG. 1 shows a first exemplary embodiment of a system for collecting machine data from a machine 1. The machine 1 can be in particular a machine tool.

The machine 1 comprises a graphical user interface 2, via which machine information is output graphically so that a machine operator can perceive it visually. The graphical user interface 2 can comprise in particular a display or a monitor.

The graphical user interface 2 is coupled to a graphical output interface 6 of the machine 1 e.g. via a corresponding line connection. The graphical output interface 6 can in particular be formed by a socket to which an inverse plug of the line connection can be plugged in order to be able to transmit the information provided by the graphical output interface 6 to the graphical user interface 2. The graphical output interface 6 can be, for example, a VGA interface, an HDMI interface, a DVI interface, or any other graphics or multimedia interface.

A signal splitter 8 is provided to collect the image information displayed on the graphical user interface 2. On the input side, the signal splitter 8 is connected to the graphical output interface 6 and has at least two output interfaces, a first output interface being coupled to the graphical user interface 2 and a second output interface being coupled to a computer unit 3. This allows the same electrical graphics signals to be received at the computer unit 3 as are transmitted to the graphical user interface 2 for display there.

Figure 2:
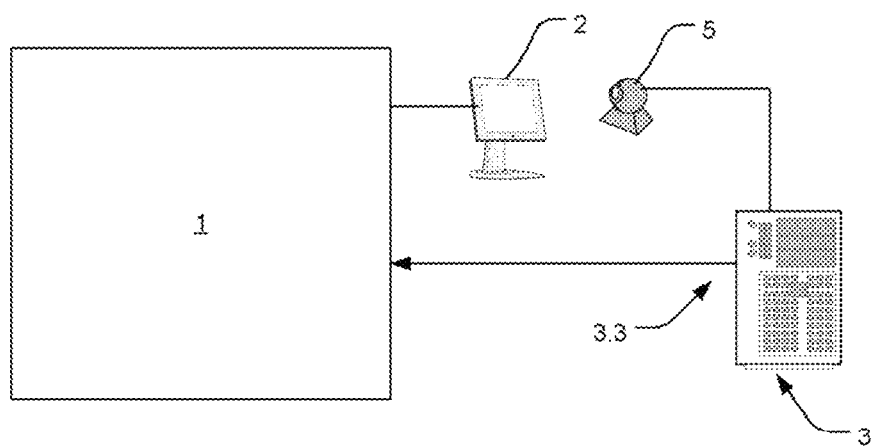
FIG. 2 shows exemplarily and schematically a second exemplary embodiment of a system for collecting machine data.

FIG. 2 shows an alternative embodiment with regard to FIG. 1, which differs from the embodiment according to FIG. 1 in that it is not the signal transmitted between the graphical output interface 6 and the graphical user interface 2 that is split and the split portion that is transmitted to the computer unit, but instead it is the display on the graphical user interface 2 that is recorded by means of a camera 5 and the output signal of this camera 5 that is transmitted to the computer unit 3. In other words, therefore, in the embodiment according to FIG. 2, a camera 5 is used as the collection unit instead of a signal splitter 8.

Figure 3:
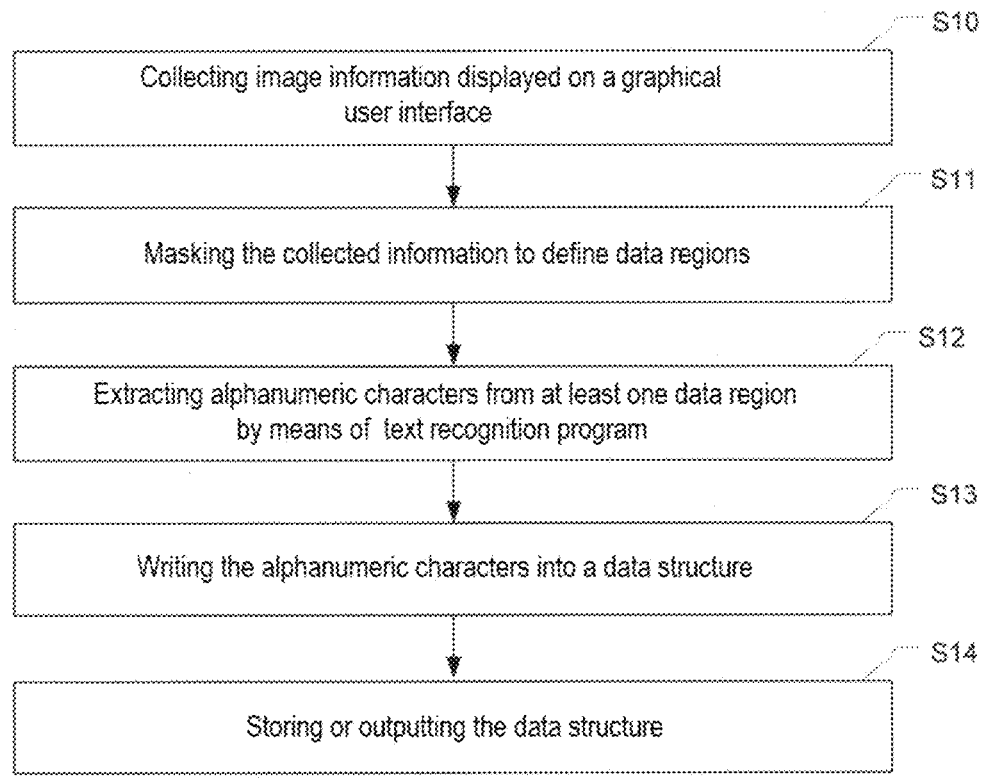
FIG. 3 shows, by way of example, a block diagram illustrating the steps of a method for collecting machine data.

In the following, the block diagram in FIG. 3 is used to describe in more detail the method for collecting machine data.

First, image information which is displayed on a graphical user interface 2 of a machine 1 is collected (S10). This collection can be carried out either by directly tapping (see exemplary embodiment according to FIG. 1) the electrical signal which is transmitted between a graphical output interface 6 and a graphical user interface 3, or by optically acquiring the display of the graphical user interface 2 by means of a camera 5 (see exemplary embodiment according to FIG. 2). The collected information is then transmitted to the computer unit 3. The computer unit 3 is configured to receive and process the collected information.

Then, the received data is masked in order to determine at least one data region in the received data (S11). This masking is in an embodiment also carried out by the computer unit 3. "Masking" in the sense of the present disclosure is here understood to mean that the received information is compared with a data mask, the data mask defining a plurality of data regions and in an embodiment indicating which type of data can be found in which data regions.

Figure 4:
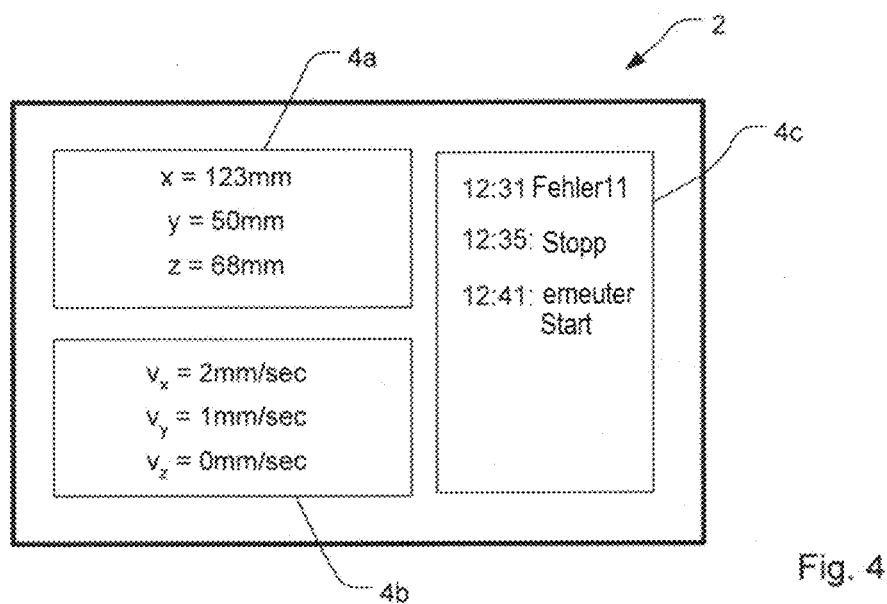
FIG. 4 shows, by way of example, a display on a graphical user interface comprising a plurality of data regions.

FIG. 4 shows, by way of example, a display on a graphical user interface 2, by means of which the step of masking the collected information is described below. The display comprises a plurality of data regions 4a, 4b, 4c, in the illustrated exemplary embodiment three data regions. The first data region 4a shows, for example, the current position of the tool or machining head of the machine 1 by means of xyz coordinates. The second data region 4b shows e.g. current velocity values of the tool or the machining head of the machine 1 along the respective spatial axis ($v_x$: velocity along the x-axis, $v_y$: velocity along the y-axis; $v_z$: velocity along the z-axis), and the third data region 4c shows points in time and the respective events that occurred at these points in time. It is understood that the described display content is merely exemplary and the present disclosure is not limited to a particular display content.

The data mask, which is in an embodiment associated with a particular machine 1 and also with a particular page displayed on the graphical user interface 2, can be used to determine at which point in the collected information which data content is found. For example, the data mask associated with the display according to FIG. 4 contains information that current position data of the tool or the machining head of the machine 1 is displayed in the first data region 4a. Furthermore, the data mask can contain information that the first line of the first data region 4a displays the x-coordinates of the tool or the machining head, the second line of the first data region 4a displays the y-coordinates of the tool or the machining head, and the third line of the first data region 4a displays the z-coordinates of the tool or the machining head, in each case in [mm].

In the same way, the data mask indicates which information can be found in the data regions 4b and 4c.

On the basis of the data mask, it is thus possible, after extracting information, to assign this information to specific data fields of a data structure to be created. For example, the value 123 mm, which indicates the x-position of the tool or the machining head at a particular point in time, can be inserted into the data structure at the corresponding row/column provided for the x-position values.

After masking the information, alphanumeric characters are extracted from at least one data region 4a, 4b, 4c, namely by text recognition, in particular an OCR program (OCR: optical character recognition) (S12). In other words, signs or sign strings are extracted from the image information containing pixels and color values associated with these pixels, namely in an embodiment on the basis of the information (e.g., font, font size, etc.) provided by the respective data mask.

These extracted alphanumeric characters are then written into a data structure (S13). This data structure can be e.g. a table containing data fields which correspond to the data regions predetermined by the data mask. Further examples of a data structure can be a text file, a data set of a database, etc.

The data structure can subsequently be stored, or it can be output at a data output interface of the computer unit 3.

During the operation of a machine 1, the image information displayed on the graphical user interface 2 can change over time. In order to be able to track this temporal change in the image information, the image information is continuously collected and processed by the computer unit 3 as previously described. The continuous collection can be, for example, a periodic collection similar to a signal sampling with a fixed or—depending on the machine program—variably adjustable collection or sampling frequency.

In order to improve the extraction result, it can be necessary to process the collected information before the extraction step. This processing can be carried out before or after masking the collected information.

For example, the processing can include filtering and/or a contrast modification. In an embodiment, the processing is performed by means of an image processing program. By processing the collected information, for example, noise in the image can be reduced and/or color contrast can be increased. By means of processing, it is thus possible to process the collected information for character extraction by the text recognition program so as to achieve a text recognition with the lowest possible recognition error rate.

The displays on the graphical user interface can vary depending on the machine 1 or the machine type. For example, different fonts and/or font sizes can be used. In addition, the display content can vary depending on the machine 1 and/or the machine type. In order to ensure that masking or text recognition is carried out in such a way that it is adapted to the respective machine 1 or machine type, the computer unit can comprise a plurality of data sets, each data set being assigned to a machine 1 or machine type. Depending on the machine 1 or machine type, the data set assigned to this machine 1 or machine type can then be used to carry out adapted masking or character extraction.

In order to ensure that the extraction of alphanumeric characters by means of the text recognition program is faultless or substantially faultless, a verification step can be carried out. In this verification step, alphanumeric characters which are extracted one after the other in time, in particular directly one after the other in time, can be compared with one another and the change in the alphanumeric characters can be assessed. In particular, the change in amount of numerical values extracted one after the other in time, in particular directly one after the other in time, can be determined and compared with a threshold value. In the event that the change in amount exceeds the threshold value, it can be concluded that the extraction was faulty.

Alternatively or additionally, it is possible to change the filter characteristics of a filter, by means of which image processing is carried out, during the verification step and to check whether a changed extraction result is obtained. If, for example, even a small change in the filter characteristics results in a significant change in the extraction result, it can be concluded that even small changes in the image information also lead to changes in the extraction result and thus to an incorrect extraction of alphanumeric characters.

As a reaction to the verification result, for example, settings of the image processing program, e.g. filter criteria, can be changed or the recognition parameters of the text recognition program can be modified. Another alternative or additional reaction to the verification result can be to change the resolution of the graphic image. In this way, for example, a distortion of the alphanumeric characters, which can result from an interpolation for resolution adaptation to target system, can be reduced or completely avoided by correct selection.

Figure 5:
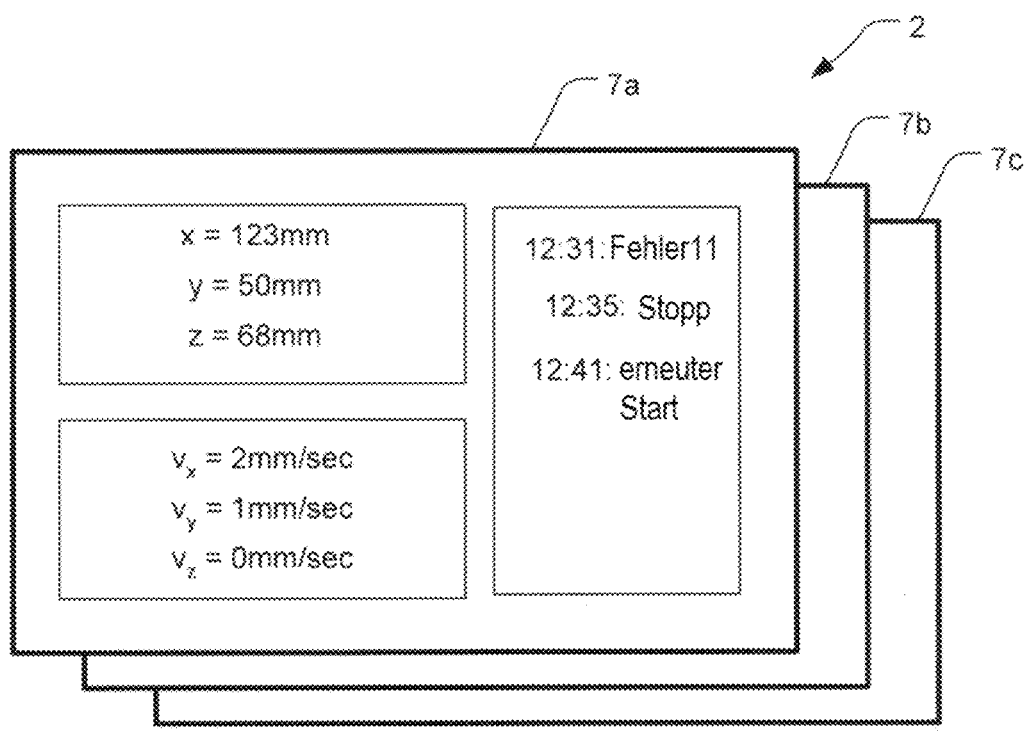
FIG. 5 shows, by way of example, a plurality of pages of a display on a graphical user interface.

In FIG. 5, multiple pages 7a, 7b, 7c are sketched that can be displayed on a graphical user interface. For example, a switching option can be provided in the control software of the machine 1, by means of which one of these pages 7a, 7b, 7c is displayed on the graphical user interface depending on the respective control or verification task of the operating staff of the machine.

In order to be able to collect the information displayed on the respective pages 7a, 7b, 7c, it is advantageous to switch between the pages 7a, 7b, 7c. In an embodiment, the switching is carried out in such a way that the pages 7a, 7b, 7c are displayed in a cyclic cycle, so that the pages 7a, 7b, 7c can be collected one after the other. The switching of the pages 7a, 7b, 7c is in an embodiment effected by a switching signal which is provided by the computer unit 3 and transmitted to the machine 1 or its machine control system, so that this switching signal triggers the switching of pages 7a, 7b, 7c.

In order to allow the user of the machine 1 to view a particular page on a monitor or display despite the switching of pages 7a, 7b, 7c, the computer unit can provide a graphical output interface on which a page 7a, 7b, 7c of the switched pages is displayed. Depending on the number of switched pages, for example, only a certain part of the image information received at the computer unit 3 can be displayed in each case on this monitor or display, so that from the switched pages 7a, 7b, 7c, for example, only the image information of page 7a is displayed.

A further possibility of giving the user of the machine 1 the opportunity to view a particular page on a monitor or display despite the switching of pages 7a, 7b, 7c is that the automatic page changes are only carried out when the system is in operating mode, i.e. an indicator is active according to which it can be concluded that the machine 1 is in active operation.

A yet further possibility of allowing the user of the machine 1 to view a particular page on a monitor or display despite the switching of the pages 7a, 7b, 7c is that the machine operators can interrupt the automatic switching for a certain period of time by an input at a user interface, for example by pressing a key, so that they themselves can visually check the status of the machine 1 in active operation. After this period has elapsed, automatic switching is resumed.

Figure 6:
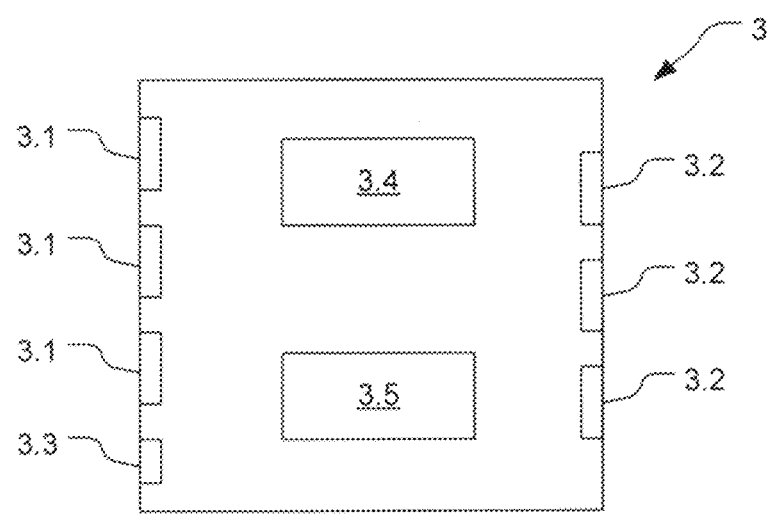
FIG. 6 shows exemplarily and schematically the structure of a computer unit for processing collected information from a machine.

FIG. 6 shows by way of example a computer unit 3, which can be used in a system for collecting machine data. The computer unit 3 comprises at least one processor 3.4 and a memory unit 3.5. The processor is configured to mask the collected information and to extract the alphanumeric characters by a text recognition program. The memory unit 3.5 is designed to at least temporarily store the data structure into which the extracted alphanumeric characters are written.

The computer unit 3 has at least one, in the illustrated exemplary embodiment three, data input interfaces 3.1. Each data input interface 3.1 is designed to be connected to a collection unit, for example a signal splitter 8 or a camera 5, in order to receive the information displayed on the graphical user interface 2. The computer unit 3 can have only a single data input interface 3.1 to be able to receive and process information displayed on the graphical user interface 2 from a single machine 1. Alternatively, it is possible for the computer unit 3 to have multiple data input interfaces 3.1 to be able to receive and process information displayed on the graphical user interface 2 from multiple machines 1.

In addition, the computer unit 3 comprises at least one, in the illustrated exemplary embodiment three, data output interfaces 3.2. One data structure each, which contains alphanumeric characters recognized by the computer unit 3, can be output at these data output interfaces 3.2. The computer unit 3 can have only a single data output interface 3.2 in order to be able to output a data structure associated with a single machine 1. Alternatively, the computer unit 3 can have a plurality of data output interfaces 3.2 so that it is possible to output data structures which are assigned to a respective machine 1 in such a way that they are distributed over a plurality of data output interfaces 3.2. Furthermore, it is possible that each of the data structures assigned to different machines 1 has an identifier by means of which it can be determined to which machine 1 an output data structure is assigned. It is thus possible to output data structures assigned to different machines 1 at a single data output interface 3.2.

In an embodiment, the computer unit 3 additionally has a switching interface 3.3. At this switching interface 3.3, the above described switching signal is provided, by means of which the switching of the pages 7a, 7b, 7c can be triggered.

The invention has been described above by means of exemplary embodiments. It is understood that numerous changes as well as modifications are possible without leaving the scope of protection defined by the claims.

LIST OF REFERENCE SIGNS

1 machine
2 graphical user interface
3 computer unit
3.1 data input interface
3.2 data output interface
3.3 switching interface
3.4 processor
3.5 memory unit
4a, 4b, 4c data region
5 camera
6 graphical output interface
7a, 7b, 7c page
8 signal splitter

What is claimed is:

1. A method for collecting machine data from a machine, comprising the following steps:
    collecting image information displayed on a graphical user interface of a machine and transmitting the collected information to a computer unit;
    masking the collected information or information derived therefrom to define data regions;
    extracting alphanumeric characters from at least one data region by means of a text recognition program;
    writing the alphanumeric characters into a data structure; and
    storing or outputting the data structure
    wherein, during operation of the machine, the image information is periodically collected at different points in time, alphanumeric characters are periodically extracted and the extracted characters are written into the data structure, so that the collected information contains information about the temporal change in the image information and the temporal change of machine data is inferred from the time-dependent course of the collected information.

2. The method according to claim 1, wherein the image information is collected by sampling with a predetermined sampling frequency.

3. The method according to claim 1, wherein the collection of the image information comprises acquiring the image information displayed on the graphical user interface by means of a camera.

4. The method according to claim 1, wherein the collection of the image information comprises the collection of the electrical image information signals transmitted between a graphical output interface and the graphical user interface.

5. The method according to claim 1, wherein the collected information or information derived therefrom is processed before the extraction of alphanumeric characters by means of at least one image processing program.

6. The method according to claim 5, wherein the processing comprises filtering and/or a contrast change, in particular a color contrast change.

7. The method according to claim 1, wherein, after the text recognition, the collected information is verified in a verification step.

8. The method according to claim 7, wherein during the verification of the collected information it is determined whether the values of temporally successively collected information change more than a predetermined change threshold value.

9. The method according to claim 7, wherein on the basis of the verification step it is determined whether there is a change in the extracted alphanumeric characters when image processing parameters are changed.

10. The method according to claim 1, wherein a plurality of data sets are stored for the collection of machine data from different machine types, each data set being assigned to one or more machine types, and each data set comprising information for masking the collected information, for filtering the collected information, for the font and/or for the font size.

11. The method according to claim 1, wherein a plurality of different pages each having different image information can be displayed on the graphical user interface, and in that switching between the pages takes place in order to collect the image information of the different pages.

12. The method according to claim 1, wherein graphic sections or image components are extracted from the image information and stored in the data structure.

13. A system for collecting machine data, comprising:
    a collection unit, by means of which image information displayed on a graphical user interface of a machine can be collected;
    a computer unit, which is coupled to the collection unit and which is designed to receive the information collected by the collection unit;
    wherein the computer unit is designed to mask the collected information or information derived therefrom to define data regions, to extract alphanumeric characters from at least one data region by means of a text recognition program, and to write the extracted alphanumeric characters into a data structure or to output the extracted alphanumeric characters into a data stream, wherein the computer unit is designed to, during operation of the machine, periodically collect the image information at different points in time, periodically extract alphanumeric characters and write the extracted characters into the data structure, so that the collected information contains information about the temporal change in the image information and the temporal change of machine data is inferred from the time-dependent course of the collected information.

14. The system according to claim 13, wherein the computer unit comprises one or more data input interfaces, via which the computer unit can be coupled to one or more collection units.

15. The system according to claim 14, wherein each data input interface and each data output interface is assigned to one machine each.

16. The system according to claim 13, wherein the computer unit comprises one or more data output interfaces, via which a data structure containing alphanumeric characters or a data stream of alphanumeric characters is output.

17. The system according to claim 13, wherein the computer unit comprises at least one switching interface for providing a switching signal by means of which switching between pages of the graphical user interface of a machine takes place.

* * * * *